May 5, 1925. 1,537,052
G. PIELSTICK
INJECTION AIR REGULATOR ESPECIALLY FOR MARINE OIL ENGINES
Filed Aug. 24, 1921
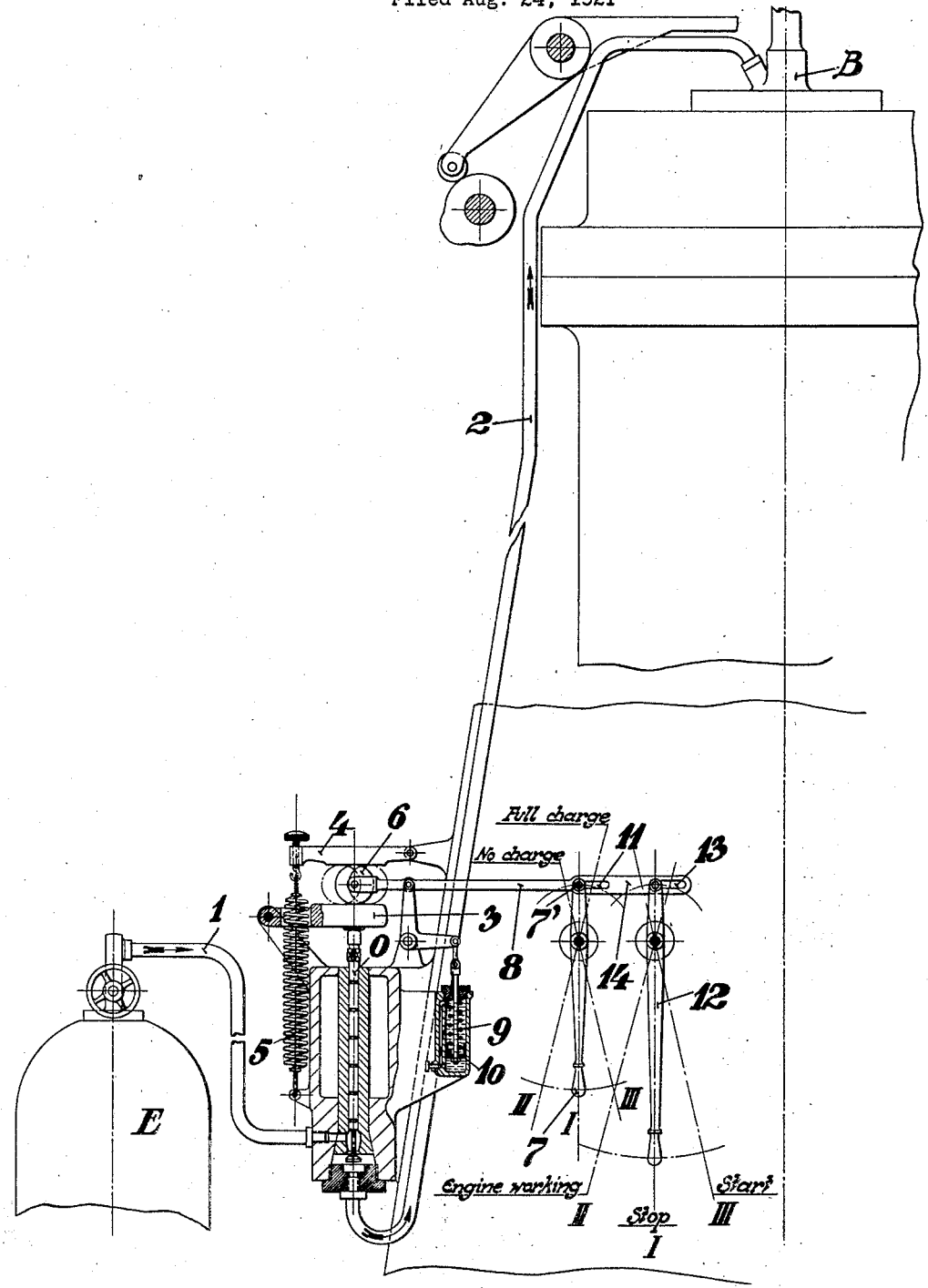
Gustav Pielstick
by Pennie, Davis, Marvin & Edmonds
his Attorneys Patented May 5, 1925.

UNITED STATES PATENT OFFICE.

GUSTAV PIELSTICK, OF AUGSBURG, GERMANY, ASSIGNOR TO THE FIRM: MASCHINEN-FABRIK AUGSBURG-NUERNBURG, AKTIENGESELLSCHAFT, OF AUGSBURG, GERMANY, A GERMAN CORPORATION.

INJECTION AIR REGULATOR ESPECIALLY FOR MARINE OIL ENGINES.

Application filed August 24, 1921. Serial No. 494,863.

(GRANTED UNDER THE PROVISIONS OF THE ACT OF MARCH 3, 1921, 41 STAT. L., 1313.)

*To all whom it may concern:*

Be it known that I, GUSTAV PIELSTICK, a citizen of the German Republic, residing at Augsburg, Germany, have invented certain new and useful Improvements in Injection Air Regulators Especially for Marine Oil Engines (for which an application was filed in Germany April 15, 1919), of which the following is a specification.

This invention relates to internal combustion engines of the Diesel type, in which the fuel is injected into the engine cylinder by means of compressed air and is atomized during this injection. More particularly, the invention is adapted for use in Diesel engines which are employed in propelling vessels, although its usefulness is not limited to engines employed for that purpose.

It is well known that in Diesel engines the pressure of the air to be injected must be varied in proportion to the fuel supply, in order that the combustion will be regulated. In other words, the pressure of the air injected will depend on the quantity of fuel injected per stroke. In some instances in which the fuel supply and the engine speed are independent, it may become necessary to vary the injection pressure both in accordance with the fuel supply and also in accordance with engine speed. In passenger and merchant marine installations conditions are less complicated, because for each load the engine has a certain definite speed, provided the amount of fuel injected per stroke remains constant, and this ratio of speed and load is fairly constant. In this type of installation, therefore, it is possible to regulate the injection pressure in accordance with the fuel supply by controlling the action of the injection pressure regulator by means of the device which determines the amount of fuel delivered to the engine. Thus the injection pressure will depend on the amount of fuel delivered. The relation between engine speed and fuel supply does not apply except under substantially unvarying conditions, because if the fuel supply is suddenly increased the engine cannot attain the new speed which would correspond to the increased supply at once, but can only arrive at the new speed after the moving masses have been accelerated to the new velocity. Consequently, in the event of a sudden increase in fuel supply it is desirable, in order to prevent sudden strains in the engine, to cause the injection pressure to increase gradually so that the moving masses of the engine will have an opportunity to attain the new speed with a gradual acceleration. If the fuel supply is suddenly decreased the injection pressure may also be decreased at the same rate, because under these conditions the engine is not subjected to any strains because the load is being diminished.

The object of this invention, therefore, is to prevent a sudden increase in injection pressure when the fuel supply is suddenly increased, while permitting a decrease in injection pressure at the same rate that the fuel supply is decreased. For this purpose the injection pressure regulator is controlled from the device which governs the quantity of fuel supplied through suitable means which includes a brake mechanism acting so that when the fuel supply is increased the injection pressure regulator will permit the injection pressure to assume an increased value only after a considerable interval of time, and the connections between the fuel supply regulator and the injection pressure regulator are such that upon a decrease in the fuel supply the injection pressure is immediately decreased without any considerable lapse of time.

In the accompanying drawing there is shown one embodiment of the invention, largely in diagrammatic form, with certain of the parts in cross section.

Referring to this drawing, the injection air is contained in a vessel E from which a pipe 1 leads to a pressure reducing valve O, which is, in turn, connected with the fuel valve B in the cylinder through the pipe 2. The pressure reducing valve O is so formed that the pressure of the air in the pipe 1 will act on two surfaces of the same size and in opposite directions, so that the pressure in the pipe 1 will have no tendency to move the valve. The valve, however, is acted upon by the pressure in the line 2 and this pressure is counterbalanced by means of a pivoted lever 3 on which rests a roller 6, and a pivoted lever 4 which is swung down so as to force the roller 6 against the lever 3 by means of a spring 5. The spring acting on the pair of levers through the roller, has a tendency to force the valve from its seat against the pressure in the pipe 2. The roller 6 which establishes the connection between the levers 3 and 4 can be shifted lengthwise of these levers so that the force exercised by the spring 5 upon the valve can be altered. As the roller is moved to the left, as shown in the figure, the spring will have a tendency to open the valve to a greater extent and at the same time more effectually throttle the injection air passing to the pipe 2. Hence, a definite injection pressure in the pipe 2 will correspond to each position of the roller 6 with reference to the levers 3 and 4.

For the purpose of moving the roller, there is provided the lever 8, having a slot 11 in which moves a pin 7' carried on the end of a pivoted hand lever 7. This lever is the usual lever provided for controlling the supply of fuel to the engine. Pivoted to the connecting rod 8 is one arm of a pivoted bell crank lever, to the other arm of which is secured the plunger 10 of an oil brake. This plunger is encircled by a spring 9, and the spring has a tendency to expand so as to rock the bell crank and force the lever 8 to the right, as shown in the drawing. The rod 8 also carries a second slot 13 in which moves a pin carried in the end of the starting lever 12, which is the starting lever usually provided in Diesel engines.

In the device as illustrated in the drawing, the lever which controls the supply of fuel is set at the half-way mark. If the engine is to receive a full supply of fuel, for example, the lever 7 will be moved to the position indicated by II. In other words, its lower end will be swung to the left. When the lever is in this position the pin 7' will move freely in the slot 11, thus releasing the rod 8, and permitting the spring 9 to force the plunger 10 downwardly, thus rocking the bell crank and moving the lever 8 to the right, carrying with it the roller 6. The movement of the rod 8 which carries the roller to the new position, is a gradual movement, because of the operation of the oil brake, and this movement continues until the left-hand end of the slot 11 is in contact with the pin 7' in the new position of the lever 7. By making the movement of the lever 8 gradual, the injection pressure will increase gradually until finally when the rod 8 has moved so as to carry the roller 6 to its new position, the injection pressure will have attained the value required for the new rate of fuel supply. If, instead of increasing the charge, it is to be decreased, then the lever 7 will be swung to the position marked III, and in this movement the pin 7', bearing against the end of the slot 11, will force the lever 8 to the left, carrying the roller 6 to the new position required. Thus, when the fuel supply level is decreased, it will be seen that the movement of the regulating device which controls the injection pressure will move at the same speed, but there is no objection to this rapid reduction in injection pressure.

By this arrangement it will be seen that the engine will work more smoothly, and will not be subjected to sudden strains when the size of the charge is increased, because the increase in the rate of injection pressure will always take place gradually, building up to the required value under the control of the oil brake mechanism. Any sudden decrease in supply will cause an immediate decrease in injection air pressure, but this is not objectionable because no excessive strains result from this action. By thus gradually increasing the injection pressure, the moving masses of the engine accelerate gradually to the new speed, and all strains are eliminated.

The frequent starting of the engine which occurs often in maneuvering, is a particularly important case in which frequent acceleration is required. During starting the fuel supply is suddenly changed and the ratio of the engine speed to the supply is changed. With the present mechanism, however, it is possible to regulate the injection pressure in accordance with the movement of the starting lever so that the injection pressure will never reach a value which is undesirable in starting. This result is brought about by reason of the connection of the starting lever with the connecting lever 8. In the drawing, the starting lever 12 is shown in the stop position. If the engine is to be started, the supply lever 7 is moved to full supply; that is, from position I to position II. The rod 8, however, is held against movement because the pin in the end of the lever 12 bears against the left-hand end of the slot 13. As the starting lever is now moved to the starting position III, the roller 6 is forced to the left into a position in which the injection pressure has the proper value for starting. As soon as the engine has come up to speed, the starting lever 12 is moved over to the working position II, when the pin in the end of the lever 12 will move along the slot 13, thus permitting the spring 9 to move the rod 8 to the right, but this movement, however, is again under the control of the oil brake so that the injection pressure will again be gradually and automatically increased so that the ratio between the injection pressure and the engine speed will be continuously maintained at the proper value.

What I claim is:

1. In an oil engine, the combination of a supply of air under pressure for injection, a connection between the supply and the engine cylinder, a pressure control valve in the connection, a fuel charge regulating lever, means for controlling the action of the pressure control valve, and a connection between the fuel charge regulating lever and the control means, operable to cause the control valve to decrease the injection pressure directly with a movement of the lever producing a decrease in the fuel charge and operable to cause a gradual movement of the control valve to increase the pressure when the regulating lever is moved to increase the fuel charge.

2. In an oil engine, the combination of a supply of air under pressure for injection, a connection between the supply and the engine cylinder, a pressure control valve in the connection, gradually operating means for causing the control valve to permit an increase in injection pressure, the said means including an oil brake, a fuel charge regulating lever, and a connection between this lever and the gradually operating means, this connection being positive when the lever is moving to cause a decrease in the fuel charge, whereby the valve is moved simultaneously with the lever to cause a decrease in the injection pressure and being releasable when the lever is moved to increase the fuel charge whereby the gradually operating means causes a slow movement of the pressure control valve to increase the injection pressure.

3. In an oil engine, a device for regulating the injection pressure, means for gradually increasing the injection pressure when the fuel charge is being increased, a fuel charge regulator, means for positively actuating the fuel charge regulator and also positively actuating the regulating device to reduce the injection pressure when the fuel charge is being decreased, starting means, and means for connecting the said starting means to the fuel charge regulator.

4. In an oil engine, a device for regulating the injection pressure, a spring actuating mechanism including an oil brake for acting on the device to increase the injection pressure gradually when the fuel charge is being increased, a fuel charge regulator connected with the device and causing a positive reduction in the injection pressure when the fuel charge is being decreased, a starting lever and an operative connection between the starting lever and the oil brake.

5. In an oil engine, the combination with a supply of air under pressure for injection connected to the engine cylinder, of a device for regulating the injection pressure and comprising the combination of a pressure control valve in the connection to the cylinder, a spring acting on this valve, a system of levers interposed between the spring and the valve for transmitting the force of the spring thereto, a member movable in conjunction with the system of levers to vary the force with which the spring acts on the valve through the levers, a fuel charge regulating lever, a connection between the movable member and the regulating lever, this connection being positive for causing a movement of the valve simultaneously with the regulating lever to decrease the injection pressure as the fuel charge is decreased, and releasable when the lever is moved to increase the fuel charge, and spring-actuated means for causing a gradual movement of the member to permit the spring first mentioned to move the valve slowly to increase the injection pressure when the lever is moved to cause an increase in the fuel charge.

6. A device for regulating injection pressure in connection with oil engines, comprising the combination of a pressure reducing valve acted upon by the injection air, a spring acting upon the pressure reducing valve, a pair of levers for transmitting the force of the spring to the valve, a movable member operatively connecting the levers, levers to start the engine and to regulate the fuel charge, a connection between the movable member and the starting and regulating levers, this connection acting positively in one direction only of movement of the levers, and automatic means for moving the movable member in that direction of movement which causes a reduction in the injection air pressure.

7. In an oil engine, the combination of a valve for controlling the pressure of the injection air, a fuel charge regulating lever, means acting on the valve and tending to move it slowly to produce an increase in injection pressure, and a connection between the lever and the said valve-moving means, this connection being positive to cause the valve to decrease the pressure simultaneously with the movement of the lever producing a decrease in the fuel charge and being releasable when the lever is moved to increase the charge to permit the valve-operating means to move the valve slowly to cause a gradual increase in injection pressure.

8. In an oil engine, the combination of a valve for controlling the pressure of the injection air, a fuel charge regulator, a lever for operating the fuel charge regulator, a starting lever, a connection between the two levers and the valve by which the movement of either lever in one direction will produce a movement of the valve to cause a decrease in the injection air pressure, the connection being broken when both levers are moved in the opposite direction, and means for gradually operating the valve to increase the injection air pressure when both levers are moved in the direction last mentioned.

In testimony whereof I have hereunto set my hand, in the presence of two subscribing witnesses.

GUSTAV PIELSTICK.

Witnesses:
  WENDELIN WIRTH,
  PAUL DREY.